(12) United States Patent
Castellino et al.

(10) Patent No.: US 9,463,418 B2
(45) Date of Patent: Oct. 11, 2016

(54) METHOD FOR THE SELECTIVE OXIDATION OF CARBON MONOXIDE AND VOLATILE ORGANIC COMPOUNDS IN OFF-GAS FURTHER COMPRISING SULPHUR DIOXIDE

(71) Applicant: Haldor Topsoe A/S, Kgs. Lyngby (DK)

(72) Inventors: Francesco Castellino, Frederiksberg C (DK); Niklas B. Jakobsson, Kågeröd (SE)

(73) Assignee: Haldor Topsoe A/S, Lyngby (DK)

( * ) Notice: Subject to any disclaimer, the term of this patent is extended or adjusted under 35 U.S.C. 154(b) by 12 days.

(21) Appl. No.: 14/423,005

(22) PCT Filed: Oct. 25, 2012

(86) PCT No.: PCT/EP2012/071147
§ 371 (c)(1),
(2) Date: Feb. 20, 2015

(87) PCT Pub. No.: WO2014/063738
PCT Pub. Date: May 1, 2014

(65) Prior Publication Data
US 2015/0209727 A1    Jul. 30, 2015

(51) Int. Cl.
*B01D 53/56* (2006.01)
*B01D 53/62* (2006.01)
*B01D 53/72* (2006.01)
*B01D 53/86* (2006.01)

(52) U.S. Cl.
CPC ......... *B01D 53/8668* (2013.01); *B01D 53/864* (2013.01); *B01D 53/865* (2013.01); *B01D 53/8656* (2013.01); *B01D 2255/1023* (2013.01); *B01D 2255/20707* (2013.01); *B01D 2255/20723* (2013.01); *B01D 2255/20776* (2013.01); *B01D 2255/30* (2013.01); *B01D 2257/404* (2013.01); *B01D 2257/502* (2013.01); *B01D 2257/708* (2013.01)

(58) Field of Classification Search
CPC .... B01D 53/62; B01D 53/72; B01D 53/864; B01D 53/8625
See application file for complete search history.

(56) References Cited

U.S. PATENT DOCUMENTS 3,758,666 A * 9/1973 Frevel .................... B01D 53/62
423/247
4,043,934 A * 8/1977 Shuler .................... B01D 53/62
252/186.33

(Continued)

FOREIGN PATENT DOCUMENTS

| CA | 2599114 C | * 8/2013 | ......... B01D 53/8625 |
| CN | 107661 | 10/1993 | |
| CN | 1576528 | 2/2005 | |

(Continued)

*Primary Examiner* — Timothy Vanoy
(74) *Attorney, Agent, or Firm* — Blank Rome LLP

(57) ABSTRACT

A method for cleaning a sulphur dioxide containing off-gas by selective oxidation of carbon monoxide and volatile organic compounds in the off-gas with reduced formation of sulphur trioxide comprising the step of contacting the off-gas with an oxidation catalyst consisting of palladium and vanadium oxide supported on a carrier.

7 Claims, 1 Drawing Sheet

(56) References Cited

U.S. PATENT DOCUMENTS

| | | | | |
|---|---|---|---|---|
| 4,071,600 A | * | 1/1978 | Schlatter | B01D 53/62 423/213.7 |
| 5,176,897 A | | 1/1993 | Lester | |
| 5,462,907 A | * | 10/1995 | Farrauto | B01D 53/864 502/304 |
| 5,527,755 A | * | 6/1996 | Wenski | B01J 23/6482 502/325 |
| 5,686,377 A | * | 11/1997 | Banno | B01D 53/864 502/330 |
| 6,207,120 B1 | | 3/2001 | Belmonte et al. | |
| 2003/0091481 A1 | * | 5/2003 | Dang | B01D 53/864 422/180 |

FOREIGN PATENT DOCUMENTS

| | | | | |
|---|---|---|---|---|
| EP | 1 493 484 A1 | | 1/2005 | |
| EP | 1 832 332 A1 | | 9/2007 | |
| ES | 2448573 T3 | * | 3/2014 | B01D 53/8625 |
| KR | 20070112201 A | * | 11/2007 | B01D 53/8625 |
| PT | 1874441 E | * | 2/2014 | B01D 53/8625 |

\* cited by examiner

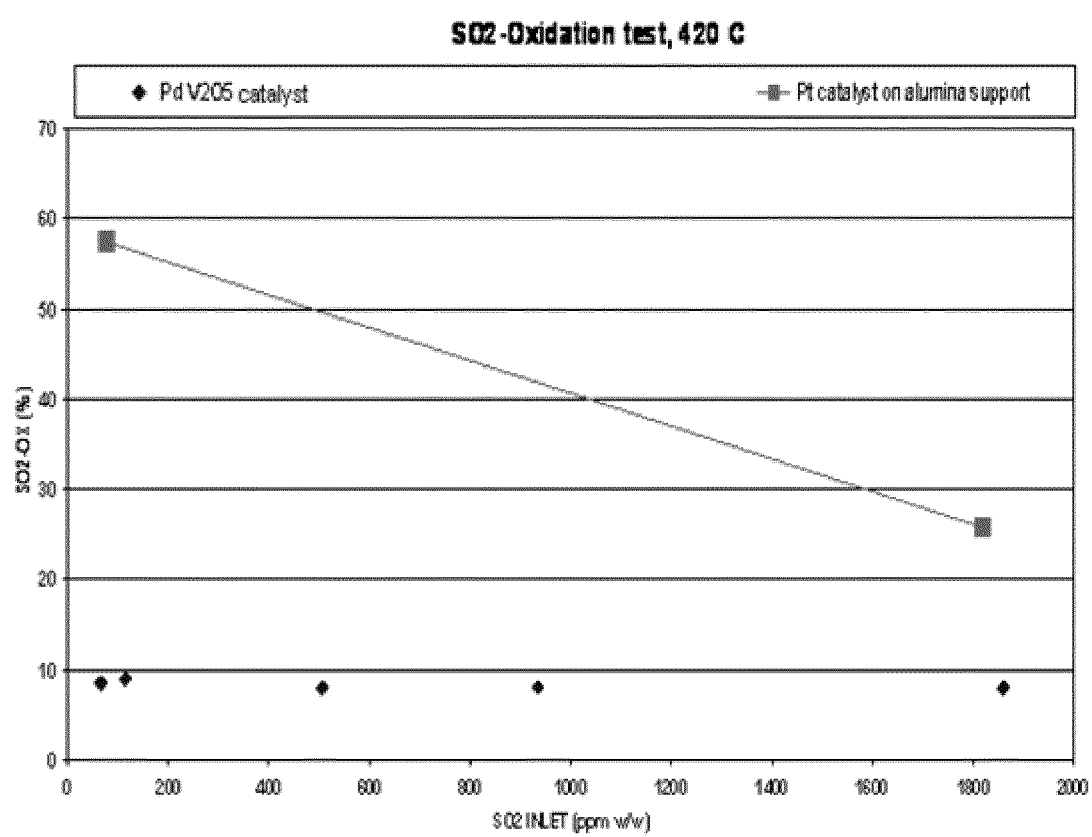

METHOD FOR THE SELECTIVE OXIDATION OF CARBON MONOXIDE AND VOLATILE ORGANIC COMPOUNDS IN OFF-GAS FURTHER COMPRISING SULPHUR DIOXIDE

The present invention relates to catalytic cleaning of sulphur dioxide containing off-gas. In particular the invention is a method for the catalytic selective oxidation of carbon monoxide and volatile organic compounds in off-gas further comprising sulphur dioxide without substantial oxidation of sulphur dioxide to sulphur trioxide in presence of a supported catalyst consisting of palladium and vanadium oxide.

Off-gases, including flue gas generally contain a certain level of SO2 and SO3. In cooling down the gas to recover heat, SO3 in the presence of moisture forms H2SO4 condensates on cold surfaces and causes corrosion issues in the heat recovery system.

Additional catalysts may also be installed in the heat recovery system, to reduce CO and volatile hydrocarbons by oxidation to CO2 and water. These catalysts are typically oxidation catalysts which apart from removing the target pollutant also oxidize SO2 to SO3 and thus adding to the problem connected to H2SO4 condensation.

In units handling nitrogen oxides (NOx) containing flue gas from combustion processes, SCR (Selective Catalytic Reduction) is commonly used to reduce the level of NOx in the gas released to the atmosphere. An SCR process catalysed by vanadium oxide or zeolites-based catalysts is commonly used to reduce NOx in the flue gas into nitrogen by reaction with ammonia. Downstream the SCR reactor SO3 can, together with slip of ammonia from the SCR section, form ammonia bisulphate (ABS) that causes corrosion and fouling on down stream equipment In the design of the Heat Recovery Steam Generation (HRSG) system from a combined cycle gas turbine plant, the temperature level where heat can be extracted from the flue gas by heat exchangers has both an upper and a lower limit. The upper temperature limit is normally set by the materials used for constructing the exchangers. The lower temperature limit is mainly set by the potential occurrence of condensation of acid gases. The condensation of an acid gas on the metal surfaces of the heat exchangers is highly unwanted. Corrosion may in fact rather rapidly and irreversibly damage the heat exchangers, causing long operation down-time for the substitution of expensive equipments. However, there is a high interest in having the upper and lower temperature as far apart as possible. In fact, the broader the range of temperature is, the more heat can be extracted from the flue gas, and the more efficient the HRSG design is.

Even if operating on natural gas, SO2 is always present in the flue gas from a gas turbine. Depending on the natural gas quality, up to 5 ppm SO2 can be found in the off gas of the turbine. NOx and CO are also produced during combustion of the gas. The emissions of NOx and CO from gas turbines are increasingly becoming regulated in many regions of the world (Today, especially US and Europe). This fact has increased the amount of HRSG designed with an air pollution control system for the abatement of these two harmful gases. These systems are solely based on catalytic converters. In the case of NOx, this is reduced by the well-known SCR by NH3 process on vanadia- or zeolites-based catalysts. In the case of CO, this is oxidized to harmless CO2 by the use of a noble metal catalyst—traditionally Pt-based. These catalysts are in all cases in the form of monoliths, which ensure low pressure drops. While removing the noxious gases, these catalysts have the ability to oxidize part of the SO2 present in the flue gas to SO3. This side reaction is highly unwanted. SO3, in the presence of water moisture forms sulphuric acid (H2SO4). If ammonia is also present ammonium bisulphate (ABS) will also form. Both H2SO4 and ABS, depending on their concentration may condense at relatively high temperatures, in a temperature range where the cold-end of the HRSG may have been placed. The coils constituting this cold-end would then be exposed to corrosion and fouling.

It is clear that the presence of both the CO-oxidation catalyst and the SCR catalyst in the design of the HRSG has the side effect to enhance the formation of acid gases depending on the SO2 oxidation activity of the employed catalysts. This fact forces the HRSG design to increase the minimum temperature of the cold-end of the HRSG, thus reducing the efficiency of the plant. Part of the heat will in fact leave the plant from the stack without being recovered.

The loss in efficiency is directly proportional to the SO2 oxidation activity of both the CO and SCR catalyst. Being a catalytic reaction, its rate is mainly dependent on the nature of the catalyst and the operating temperature.

The traditional CO-oxidation catalysts based on Pt are well-known to be very active in the SO2 oxidation reaction. On the other end, the SCR catalysts only have a small fraction of the Pt-based catalyst activity. With regards to the temperature, the oxidation activity is exponentially dependent on the temperature. An increase in the operating temperature would importantly increase the rate of reaction. Traditionally, Pt-based catalysts for the CO oxidation at turbine applications are operating at higher temperatures than the SCR catalyst. They in fact are always sitting upstream the SCR catalyst, operating at temperatures up to 100° C. higher than the SCR catalyst operating temperature. It should be then clear that because of both their nature and the operating temperature they are exposed to, the CO catalyst is the main responsible for the SO3 formation in the HRSG and subsequently for the decreased efficiency of the HRSG.

The temperature level and position for the SCR and CO oxidation catalyst may differ due to HRSG design and plant load. In all layouts the level of SO2 oxidation is highly affected by the CO oxidation catalyst.

Another example of where the heat recovery is limited by SO3 precipitation and ABS formation is in a tubular steam reformer. In a tubular steam reforming, steam and hydrocarbons together with heat react over a catalyst (often Ni based) to form synthesis gas for production of hydrogen, methanol, Ammonia, FT diesel etc. Natural gas and PSA off gas are often used to generate the heat needed in the furnace to supply energy for the highly endothermic steam reforming process. The generated flue gas contains NOx and using SCR to remove NOx is becoming more and more common. In a similar manner as for gas turbines H2SO4 condensation and ABS formation is an issue in the cold end of the waste heat section.

It is thus the general object to provide a method for cleaning an off-gas by catalytic oxidative removal of carbon monoxide and volatile organic compounds from sulphur oxide containing off-gas without or reduced oxidation of sulphur dioxide to sulphur trioxide in order to reduce formation of sulphuric acid and/or ammonia bisulphate in down stream equipment.

BRIEF DESCRIPTION OF THE DRAWINGS

FIG. 1 is a graph comparing catalytic oxidation of $SO_2$ oxidation at 50-2000 ppm $SO_2$ in the flue gas using a platinum on alumina catalyst with a $V_2O_5$ catalyst.

We have found that a combination of Pd and vanadium oxide has high catalytic activity for oxidizing CO, hydrocarbons and ammonia whereas the oxidation of SO2 is surprisingly low. This attractive feature is particularly useful for processes utilizing fuels with low sulphur content. In these cases, SO2 oxidation over the installed catalyst will in fact be the limiting factor for formation of ABS and govern the total SO3 level in the gas. The latter will limit the minimum flue gas outlet temperature with respect to H2SO4 condensation and ABS formation and thus limit the maximum efficiency with respect to heat recovery for the unit.

The surprisingly low SO2 oxidation activity of a catalyst with vanadium oxide and palladium will result in that the flue gas exhaust temperature can be lowered and the plant efficiency increased without increased risk for corrosion from sulphuric acid precipitation and ABS formation.

Pursuant to the above findings, this invention provides a method for cleaning a sulphur dioxide containing off-gas by selective oxidation of carbon monoxide and volatile organic compounds in the off-gas with reduced formation of sulphur trioxide comprising the step of contacting the off-gas with an oxidation catalyst consisting of palladium and vanadium oxide supported on a carrier.

It is common practice to use a catalyst based on platinum supported on alumina for applications such as CO oxidation, hydrocarbon oxidation and excess ammonia destruction. FIG. 1 in the drawings displays a benchmark with equal load of noble metal and comparing the SO2 oxidation from 50-2000 ppm SO2 in the flue gas. FIG. 1 clearly shows that the catalyst according to the invention based on V2O5 and Pd results in a substantial lower SO2 oxidation level.

Thus, the method according to the invention is in particular useful when treating off-gases containing between 0.01 and 2000 ppm by volume sulphur dioxide.

Preferably, the catalyst carrier comprises at least one of oxides of titanium, tungsten and silicon.

In a specific embodiment the catalyst carrier is monolithic shaped.

As discussed above treatment of off-gases formed in combustion of fuel (flue gas) for removal of carbon monoxide and VOC is in particular problematic. These gases contain both sulphur dioxide, NOx formed during combustion and excess of ammonia from the SCR make heat recovery troublesome.

The catalyst according to the invention is for use in cleaning of such gases particularly useful. It has been shown the catalyst is able to oxidize excess NH3, CO and VOC with minimum oxidation of SO2, enabling a more efficient heat recovery and thus higher plant efficiency.

Thus in additional embodiments of the invention, the off-gas further contains nitrogen oxide and the off-gas is treated for selective reduction of the nitrogen oxides by contacting the off-gas with a catalyst being effective in the selective reduction prior or subsequent to the off-gas is contacted with the vanadium oxide an palladium containing oxidation catalyst.

In further an embodiment of the invention, heat contained in the off-gas is removed from the off-gas after the cleaning by indirect heat exchange.

In the above disclosed embodiments it is preferred that the oxidation catalyst contains Pd in amounts of between 10 ppm and 3000 ppm by weight and $V_2O_5$ between 0.1 and 5 weight %. It is further preferred that $V_2O_5$ and Pd are supported by a monolithic $TiO_2$ carrier also containing $WO_3$ and $SiO_2$.

The oxidation catalyst is prepared by conventional impregnation of the support material with a solution of a precursor of the active components and subsequent decomposition to the active components.

The invention claimed is:

1. A method for cleaning a sulphur dioxide containing off-gas by selective oxidation of carbon monoxide and volatile organic compounds in the off-gas with reduced formation of sulphur trioxide comprising the step of contacting the off-gas which contains between 0.01 and 2000 ppm by volume sulphur dioxide with an oxidation catalyst consisting of palladium and vanadium oxide supported on a carrier.

2. The method of claim 1, wherein the carrier further comprises at least one of oxides of titanium, tungsten and silicon.

3. The method of claim 1, wherein the catalyst carrier is monolithic shaped.

4. The method according to claim 1, wherein the off-gas further contains nitrogen oxide and wherein the off-gas is treated for selective reduction of the nitrogen oxides by contacting the off-gas with a catalyst being effective in the selective reduction prior to the off-gas is contacted with the oxidation catalyst.

5. The method according to claim 1, wherein the off-gas further contains nitrogen oxide and wherein the off-gas is treated for selective reduction of the nitrogen oxides by contacting the off-gas with a catalyst being effective in the selective reduction subsequent to the off-gas is contacted with the oxidation catalyst.

6. The method according to claim 1, wherein heat contained in the off-gas is removed from the off-gas after the cleaning by indirect heat exchange.

7. The method according to claim 1, wherein the oxidation catalyst contains Pd in the range of between 10 ppm and 3000 ppm by weight and the oxidation catalyst contains $V_2O_5$ in the range of between 0.1 and 5 weight %.

* * * * *